(12) United States Patent
Smith et al.

(10) Patent No.: US 12,313,297 B2
(45) Date of Patent: May 27, 2025

(54) THIN-WALLED TUBE HEATER FOR FLUID

(71) Applicant: LEXMARK INTERNATIONAL, INC., Lexington, KY (US)

(72) Inventors: Jerry Wayne Smith, Irvine, KY (US); Makoto Aoki, Ishikawa (JP)

(73) Assignee: LEXMARK INTERNATIONAL, INC., Lexington, KY (US)

( * ) Notice: Subject to any disclaimer, the term of this patent is extended or adjusted under 35 U.S.C. 154(b) by 962 days.

(21) Appl. No.: 17/158,255

(22) Filed: Jan. 26, 2021

(65) Prior Publication Data

US 2021/0235549 A1 Jul. 29, 2021

Related U.S. Application Data

(60) Provisional application No. 62/966,083, filed on Jan. 27, 2020.

(51) Int. Cl.
*F24H 1/14* (2022.01)
*B32B 15/01* (2006.01)
(Continued)

(52) U.S. Cl.
CPC ............... *F24H 1/142* (2013.01); *C23C 4/08* (2013.01); *C23C 4/131* (2016.01); *F24H 1/102* (2013.01); *F24H 3/002* (2013.01); *F24H 9/1827* (2013.01); *F24H 9/1872* (2013.01); *H05B 3/48* (2013.01); *B32B 15/017* (2013.01); *B32B 2250/04* (2013.01); *B32B 2307/302* (2013.01); *B32B 2307/304* (2013.01); *B32B 2311/09* (2013.01); *B32B 2311/24* (2013.01);
(Continued)

(58) Field of Classification Search
CPC .......... F24H 1/102; F24H 3/002; F24H 1/142; F24H 9/1827; F24H 9/1872; F24H 2250/02; C23C 4/08; C23C 28/322; C23C 4/131; C23C 4/02; C23C 28/345; C23C 4/18; C23C 28/00; H05B 3/48; H05B 3/46; H05B 2203/017; H05B 2203/013; H05B 2203/003; H05B 2203/012; H05B 2203/021; B32B 2307/302; B32B 2250/04; B32B 15/017; B32B 2315/08; B32B 2311/09; B32B 2311/30; B32B 2307/304; B32B 2311/24
USPC ........................................................... 219/544
See application file for complete search history.

(56) References Cited

U.S. PATENT DOCUMENTS

474,797 A * 5/1892 Mitchell .................. F24H 3/002
392/375
2,245,276 A * 6/1941 Hugentobler ............. B41C 1/10
205/127
(Continued)

*Primary Examiner* — Eric S Stapleton (57) ABSTRACT

A tube heater for heating a fluid in an interior of the tube has a stainless steel cylindrical core. The core ranges about 3 to 300 mm in length and about 100 to 200 microns in thickness with an outer diameter of about 8 to 20 mm. An inner surface of the core has dimples and a conductive coating. A patterned resistive layer overlies the core in a thickness of about 9 to 15 microns. The resistive layer is thin- or thick-film printed about a circumference of the core. Two glass layers surround the resistive layer. Each glass layer is electrically insulative. The glass underlying the resistive layer has a thermal conductivity of more than 2 W/mK while the glass overlying the resistive layer has a thermal conductivity of less than or equal to 0.5 W/mK.

8 Claims, 9 Drawing Sheets

(51) Int. Cl.
*C23C 4/08* (2016.01)
*C23C 4/131* (2016.01)
*F24H 1/10* (2022.01)
*F24H 3/00* (2022.01)
*F24H 9/1818* (2022.01)
*F24H 9/1863* (2022.01)
*H05B 3/48* (2006.01)

(52) U.S. Cl.
CPC ....... *B32B 2311/30* (2013.01); *B32B 2315/08* (2013.01); *F24H 2250/02* (2013.01); *H05B 2203/013* (2013.01); *H05B 2203/017* (2013.01); *H05B 2203/021* (2013.01)

(56) References Cited

U.S. PATENT DOCUMENTS

| | | | | |
|---|---|---|---|---|
| 2,482,050 | A * | 9/1949 | Yejeski | F24H 3/002 219/536 |
| 5,756,215 | A * | 5/1998 | Sawamura | H05B 3/148 219/544 |
| 6,365,879 | B1 * | 4/2002 | Kuibira | H01L 21/67103 219/544 |
| 6,731,496 | B2 * | 5/2004 | Hiramatsu | H05B 3/143 219/544 |
| 6,887,316 | B2 * | 5/2005 | Hiramatsu | H05B 3/143 219/544 |
| 2002/0000007 | A1 * | 1/2002 | Pittman | H05B 3/26 219/535 |
| 2002/0012804 | A1 * | 1/2002 | Heimann | C25D 9/04 205/108 |
| 2005/0083638 | A1 * | 4/2005 | Warren | F01P 11/20 361/600 |
| 2005/0227179 | A1 * | 10/2005 | Miyagawa | G03F 7/26 430/300 |
| 2006/0138121 | A1 * | 6/2006 | Werkman | H05B 3/26 219/543 |
| 2007/0007267 | A1 * | 1/2007 | Rayl | H05B 3/34 219/217 |
| 2007/0184289 | A1 * | 8/2007 | Kumar | B32B 15/08 524/440 |
| 2008/0118681 | A1 * | 5/2008 | Ueno | B32B 37/0046 156/367 |
| 2009/0246653 | A1 * | 10/2009 | Sugasaki | B41C 1/05 430/18 |
| 2010/0068470 | A1 * | 3/2010 | Sugasaki | B41C 1/05 430/286.1 |
| 2010/0075118 | A1 * | 3/2010 | Sugasaki | B41C 1/05 430/286.1 |
| 2010/0248151 | A1 * | 9/2010 | Tomita | G03F 7/24 430/306 |
| 2010/0307356 | A1 * | 12/2010 | Rossini | B41N 10/04 101/375 |
| 2011/0045267 | A1 * | 2/2011 | Appel | B32B 7/022 428/220 |
| 2013/0306186 | A1 * | 11/2013 | Goulet | B32B 1/08 138/149 |
| 2014/0037857 | A1 * | 2/2014 | Cheverton | C04B 41/5031 427/586 |
| 2014/0315345 | A1 * | 10/2014 | Petkie | H10N 10/17 438/54 |
| 2015/0050504 | A1 * | 2/2015 | Lee | B32B 37/02 156/306.6 |
| 2015/0344173 | A1 * | 12/2015 | Kojima | B29C 66/81435 428/34.1 |
| 2016/0167343 | A1 * | 6/2016 | Gulati | C03B 27/0413 428/218 |
| 2016/0257610 | A1 * | 9/2016 | Kodama | B32B 17/06 |
| 2016/0375669 | A1 * | 12/2016 | Gibson | B32B 33/00 156/105 |
| 2017/0136196 | A1 * | 5/2017 | Davidson | A61M 11/042 |
| 2017/0295612 | A1 * | 10/2017 | Smith | H05B 3/42 |

\* cited by examiner

THIN-WALLED TUBE HEATER FOR FLUID

This utility application claims priority from U.S. Provisional Application Ser. No. 62/966,083, filed Jan. 27, 2020, whose entire contents are incorporated herein by reference.

FIELD OF THE INVENTION

The present disclosure relates to a tube heater for a variety of uses. It relates further to a relatively thin-walled tube that heats fluid such as gas and liquid when the fluid passes through the interior of the tube. The tube defines a base composition or core having a circumferentially thin- or thick-film printed resistive layer thereon, including electrically insulative glass layers about the resistive layer one with relatively high and one with relatively low thermal conductivity.

BACKGROUND

Tube heaters have many and diverse applications for heating fluid. Large numbers in the marketplace today, however, suffer slow warm-up times and have safety issues depending upon use. Typical tubes consist of ceramics (e.g., aluminum oxide) or metal (e.g., aluminum or stainless steel) that become thick-film printed with a resistive material that serves as a heating element. The tubes are also generally very thick, greater than 1 mm, which limits the speed of thermal transfer from the heating element to the interior of the tube. When metal, an insulating layer of glass exists between the tube and heating element, but typically such has a low thermal conductivity of less than 1 W/mK further slowing the rate of thermal transfer from the heater element to the fluid. A compromise does exist, though, whereby the thickness of the glass is thinned so that the high potential operating voltage is lowered to approximately twice the operating voltage of the tube heater, e.g., the high potential is set at 440V for a tube heater rated at an operating voltage of 220V. This approach, unfortunately, has an ability to compromise safety. The inventors, thusly, identify a need to overcome these and other problems. The inventors further note that any solutions in the technology of tube heaters should further contemplate the competing design constraints found in power consumption, safety features, warm-up characteristics, operating temperatures, heating speeds, thermal conductivity, materials, costs, electrical requirements, construction, materials to-be-heated, temperature control, installation/integration with other components, size, shape, and dimensions, and the like.

SUMMARY

A tube heater for heating a fluid in an interior of the tube has a stainless steel cylindrical core. The core ranges about 3 to 300 mm in length and about 100 to 200 microns in thickness with an outer diameter of about 8 to 20 mm. An inner surface of the core has dimples to increase surface area and a conductive coating, such as aluminum, to improve thermal transfer. A conductive mesh, such as aluminum, copper, or brass, can be also placed in contact with the inner surface to improve thermal transfer. Overlying the core is a heater in the form of a patterned resistive layer in a thickness of about 9 to 15 microns. The resistive layer is thin- or thick-film printed about a circumference of the tube. A conductor layer connects ends of the resistive layer to form a serpentine path about the core and provide a means to connect the resistive layer to power for heating during use. Two glass layers surround the resistive layer. Each glass layer is electrically insulative. The glass underlying the resistive layer has a thermal conductivity of more than 2 W/mK. The glass overlying layer it has a thermal conductivity of less than or equal to 0.5 W/mK.

As a result, the glass thickness of the underlying layer need not be made too thin, thus improving safety, yet matching heating rates of modern tube heaters. The overlying layer prevents heat loss of the tube heater. Various filler particles may also accompany the glass, such as thermally conductive filler particles like aluminum oxide to maintain a coefficient of thermal expansion in the underlying layer that closely matches the materials of the resistive layer, conductor layer, and tube. It is noted that a tube heater of the foregoing type greatly improves over the art the rate of heat transfer to the fluid from the resistive layer. Various embodiments teach the material compositions and relative dimensions of the tube and layers and the process conditions for the manufacture thereof.

One or more thermistors attach to the core on either a proximal or distal end or both. The thermistor(s) provide closed loop thermal control of the heater. A representative technique to attach the thermistor(s) to the core includes directly welding the lead frame legs of the thermistor lead frame to the core or any conductors thereof.

DETAILED DESCRIPTION

Figure 1:
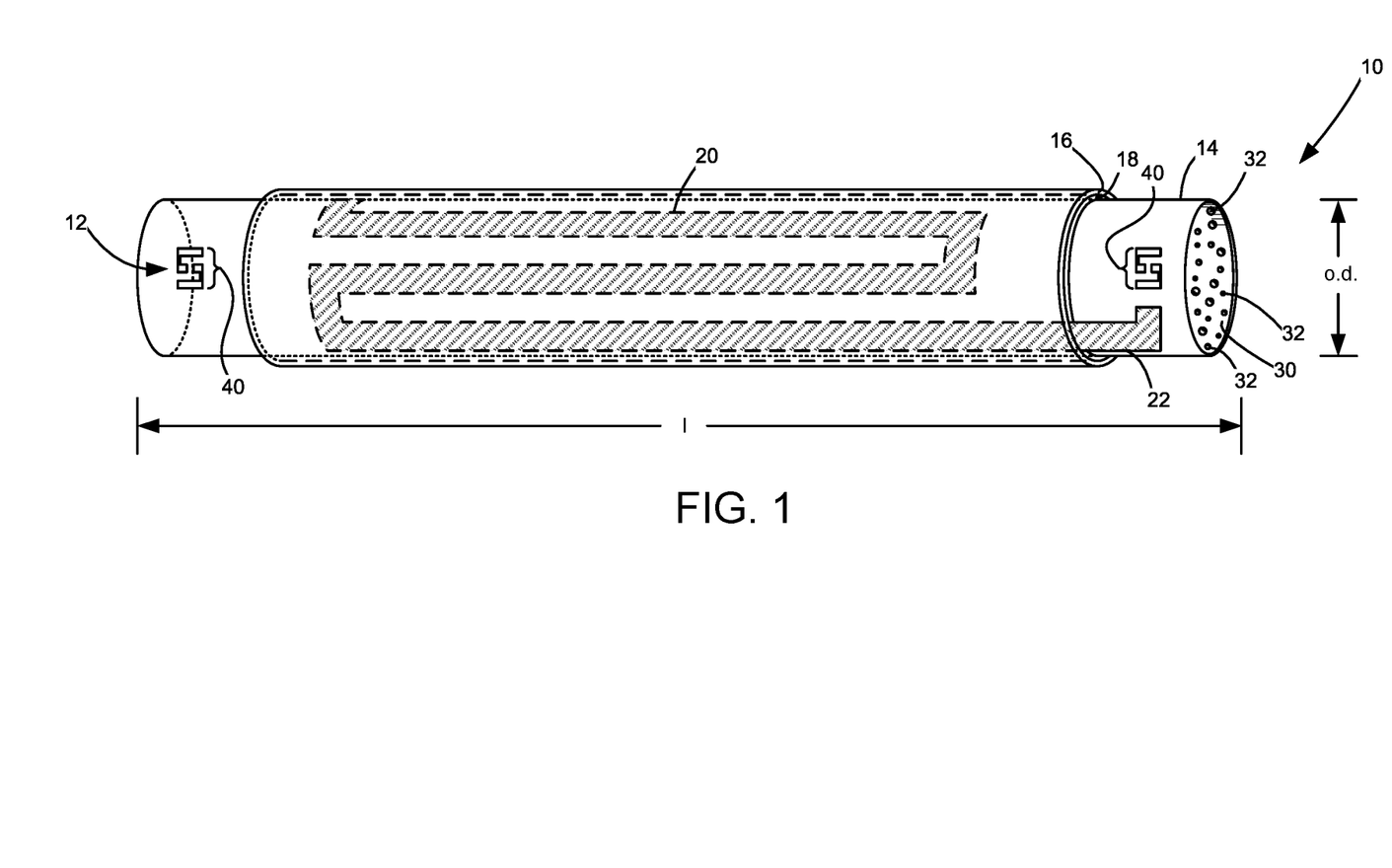
FIG. 1 is a tube heater according to a representative embodiment of the present invention.

FIG. 1 teaches a tube heater 10 for a variety of uses, especially heating a fluid flowing through an interior 12 thereof. The fluid comprises liquids or gases. Water and air are common. The tube heater has a variety of applications. It is envisioned the tube heater will find utility in kitchen appliances, such as dishwashers, coffee makers, washing machines, and like appliances requiring hot air or water. Appliances currently using reservoirs to hold water for pre-heating will find particular advantage using the tube heater herein as fluid can be heated on-demand. The tube heater gives rise to further utility in on-demand water heaters and kitchen faucet usage. Heating of air in the tube heater also allows for direct or auxiliary heating, e.g., for a heat pump in an HVAC system. Rather than requiring a centralized heating source, which suffers significant heating loss when moving air from a centralized heater to points of usage, the tube heater herein can be used on-demand as needed in residential and commercial buildings or similar environments. It is even envisioned that the tube heater can be placed over existing tubes and heat water, such as a tube heater 10 that heats water flowing through existing copper water pipes placed in the interior 12.

As will be seen, the tube heater 10 utilizes a material set in a manner to overcome the problems of the prior art having inefficient warm-up times and/or safety issues. At its essence, the tube heater 10 includes a variety of layers, such as glass 16, 18, resistive traces 20, and conductors 22 on a core 14. The core typifies a metal or metal composition with stainless steel grade 430 being a preferred instance. Typical properties of grade 430 include, but are not limited to: thermal conductivity of about 26 W/mK; tensile strength greater than 500 MPa; melting temperature in a range of 1425° to 1510° C.; and a coefficient of thermal expansion equal to $5.7 \times 10^{-6}$. As such, stainless steel grade 430 can be deep drawn to form a very thin tube, e.g., having a wall thickness as low as 35 microns at a seamless tube length of at least 300 mm. The steel is also known for having good corrosion resistance and formability. Grade 430 stainless steel is usually provided in bar form.

The core used herein is also relative thin compared to known tube heaters and has an outer diameter (o.d.) ranging from about 8 to 20 mm. Its inner diameter ranges such that a thickness of the core from the inner diameter to its outer diameter is less than 1000 microns, with 100 to 200 microns being optimal. A length (l) of the core ranges variously, but about 3 to 300 mm has been prototyped and is representative. On an inner surface 30 of the core is one or more dimples 32 to increase the surface area of the core. The dimples are optionally coated with a conductor, such as aluminum, to improve heat transfer into the interior 12. The construction of the core, its dimples and coating will be described below in relation to the process of preparing the core for its overlying layers for use as a tube heater. One or more thermistors 40 may be also configured with the core to provide a relative temperature. The thermistors may be attached by welding. Also, in instances where the stainless steel core has a wall thickness less than about 750 microns, the tube should be processed for layering with an inside rod or mandrel during the printing, drying (e.g. 80° C. for approximately 10 minutes), and firing (e.g., ramp up from room temperature to over $800°$ C. for at least 10 minutes and controlled cooling back to room temperature—about a 1 hour cycle) process steps.

Figure 2A:
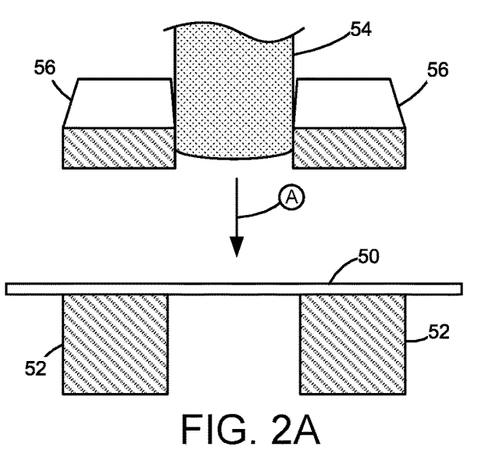
FIGS. 2A-2J are diagrammatic views of a representative sequence of creating a tube and preparing it to become a tube heater.
Figure 2B:
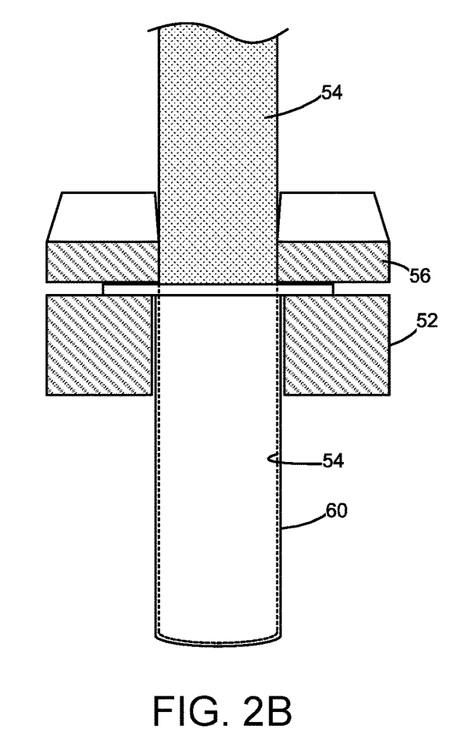
Figure 2C:
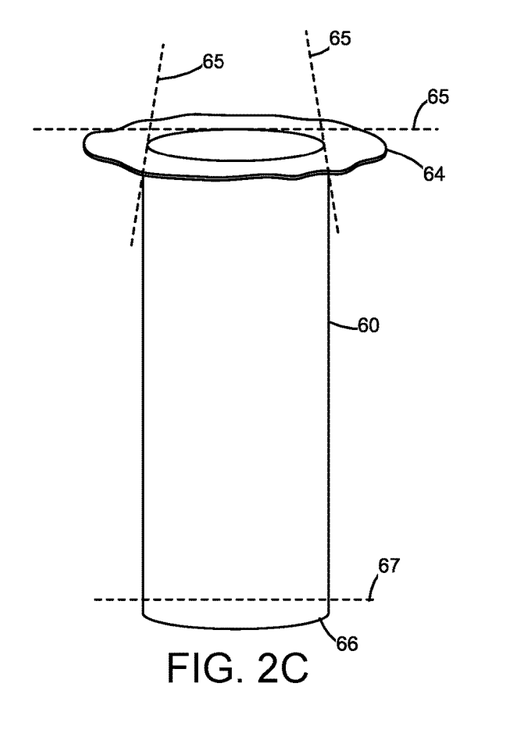
Figure 2D:
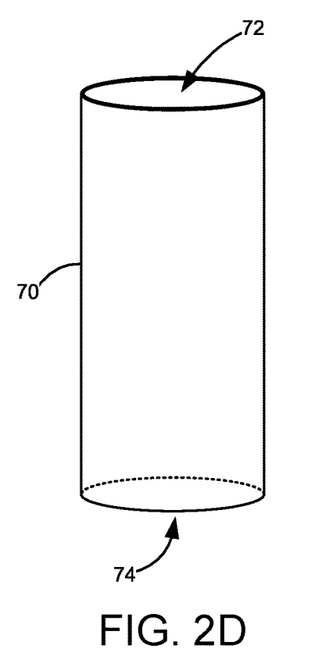
Figure 2E:
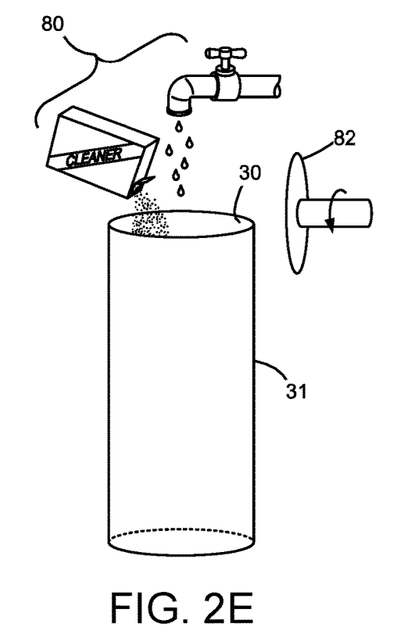

With continued reference to FIG. 1, and the processes of manufacture in FIGS. 2A-2J, the core begins as a blank 50 (FIG. 2A) of raw material, such as stainless steel. The blank is set in a deep-draw configuration including a die 52 for supporting the blank. A punch 54 is supported by a punch holder 56 and moves in a direction (A) toward the blank to deep draw a cylindrical shape of the core. For longer tubes, however, spinning the tubes takes place with outside rollers with support on the inside of the tubes with a rod (not shown). The spinning process thins and lengthens the tube, as in the case of deep drawing. As seen in FIG. 2B, the punch 54 travels into an interior of the blank as the punch holder and die are brought closer together which results in an intermediate configuration 60 of the core having a longitudinal extent in the direction of movement of the punch. In FIG. 2C, excess material 64 is excised 65 from the configuration 60 as is a closed end 66 cut open along 67 to result in a core in FIG. 2D having a cylindrical or tube shape 70 with open ends 72, 74. At FIG. 2E, the tube is cleaned 80 with cleanser and fluid and/or polished 82 to finish the inner and outer surfaces 30, 31 of the tube.

Figure 2F:
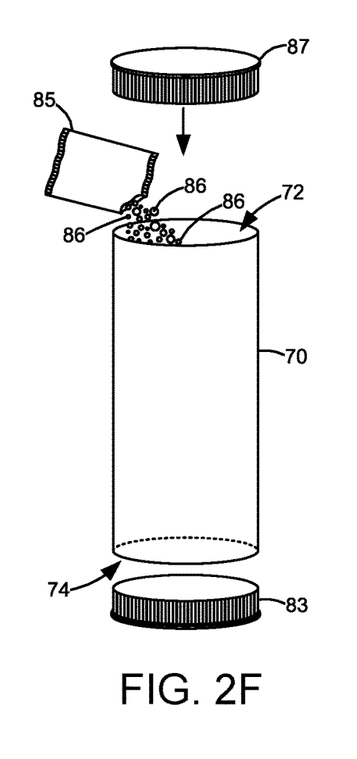
Figure 2G:
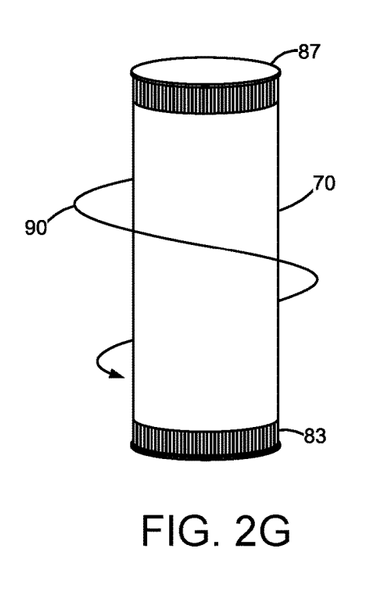
Figure 2H:
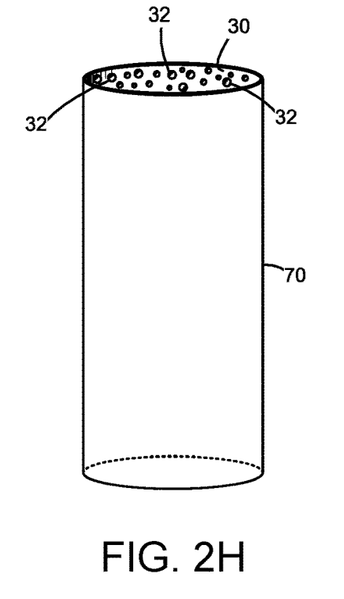
Figure 2I:
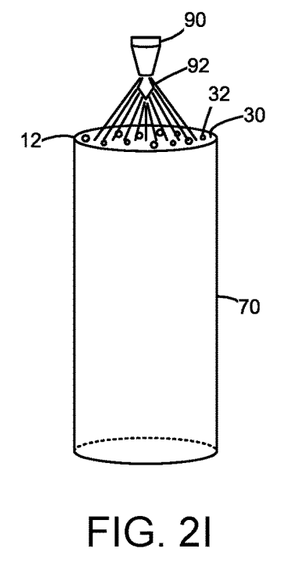
Figure 2J:
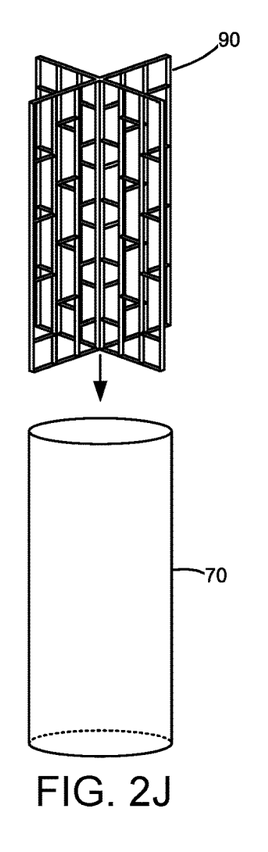

At FIG. 2F, one open end 74 of the tube 70 is closed with a cover 83 and the interior 12 of the tube is filled 85 with various sized balls 86. The other open end 72 is closed with another cover 87 to seal inside the balls 86 in the interior of the tube. As in FIG. 2G, the tube is agitated 90, such as by spinning or shaking so that the balls in the interior impact the inner surface of the tube and create a variety of dimples 32 in the inner surface 30 as seen in FIG. 2H. Of course, the dimples could be of any size and be varied or uniform. The balls used to create the dimpling are ceramic, such as aluminum oxide, or metal, such as stainless steel. In either, the interior 12 of the tube is (optionally) next arc-sprayed 90 with a conductor 92 to coat the dimples 32 and inner surface 30 with a conductive coating as seen in FIG. 2I. The conductor can be aluminum, for example. The core is thusly prepared and ready for layering, such as by thick- and thin-film printing. At FIG. 2J, a conductive mesh 90, such as aluminum, copper, or mesh can be optionally placed into contact with the inner surface to improve heat transfer to the fluid flowing through the tube heater during use.

With further reference to FIG. 1, and the processes of FIGS. 3A-3F, glass is next layered on the core 14. The glass is any of a variety, but typically defines a glass having a viscosity of 100 Pa·s or less. More particularly, the viscosity exists at 90 Pa·s or less, especially 65 Pa·s or less. Its solid content, on the other hand, exists at 65% or more. In various specific embodiments, the glass is purchased commercially from AGC, Inc. (formerly the Asahi Glass Company). A representative glass from AGC is identified commercially as AGC Class Sato 31H. Importantly, the glass is also electrically insulative and has a thermal conductivity of 2 W/mK or greater. As such, heat transfers effectively through the glass from the resistive trace but does not electrically short the core to the trace. The glass is also layered to a thickness of about 40 to 50 microns. Conductive filler materials may reside in the glass to enhance thermal conductivity. These include, but are not limited to, metals and nitrides or oxides thereof, such as aluminum, aluminum oxide, or aluminum nitride or, alternatively, boron nitride. Such a filler maintains a coefficient of thermal expansion closely matching the resistive traces, conductor, and core materials of the tube heater.

Figure 3A:
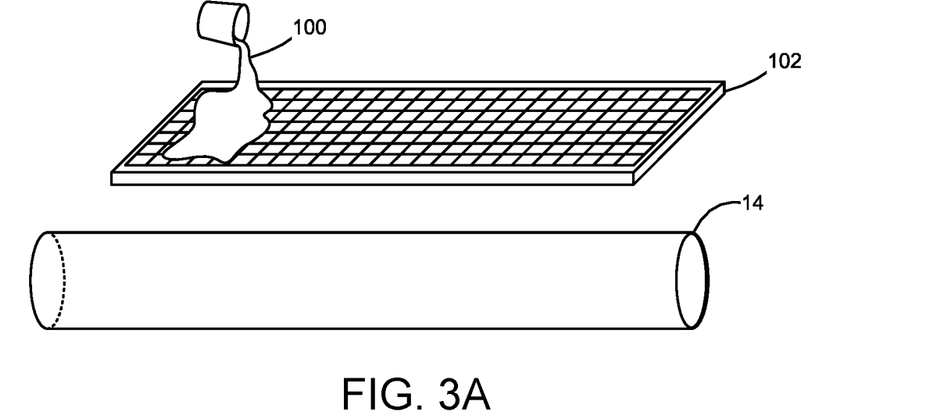
FIGS. 3A-3F are diagrammatic views of a representative sequence for layering a glass when forming a tube heater.
Figure 3B:
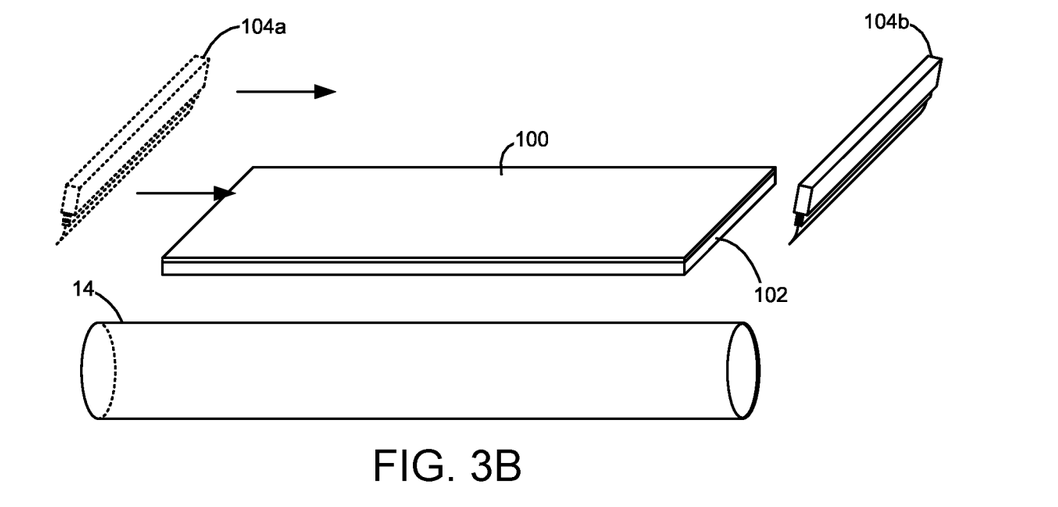
Figure 3C:
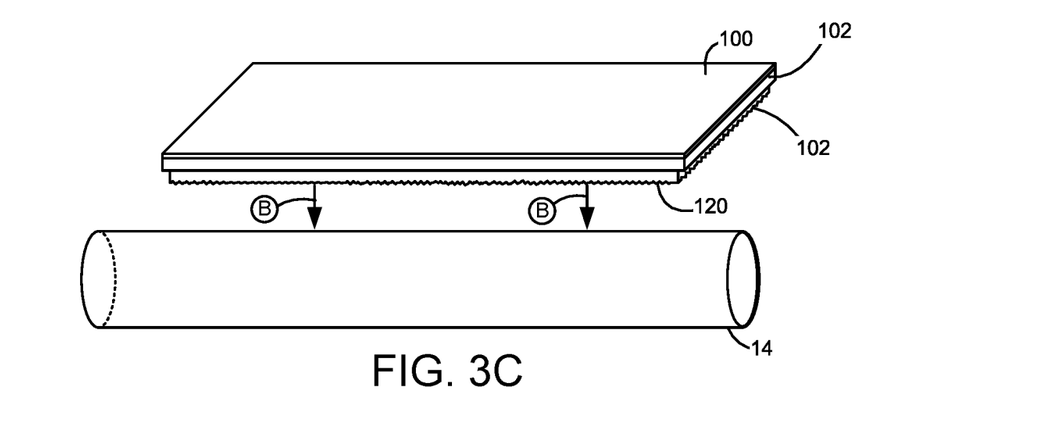
Figure 3D:
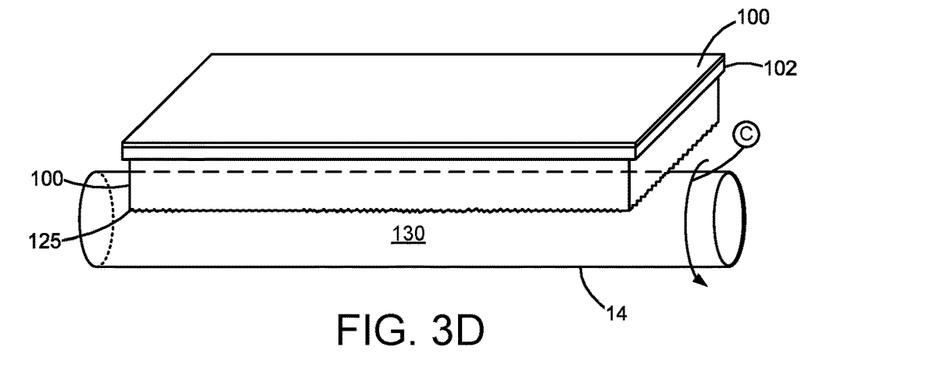
Figure 3E:
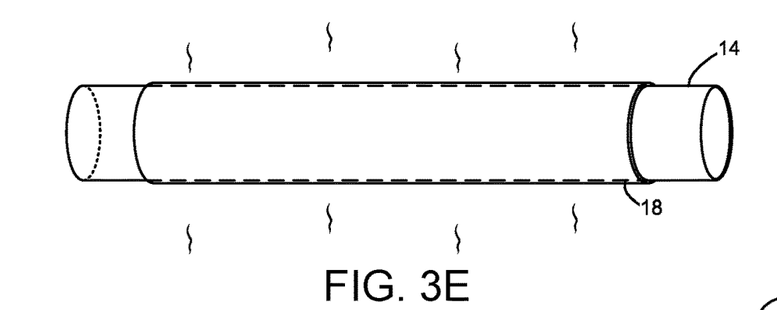
Figure 3F:
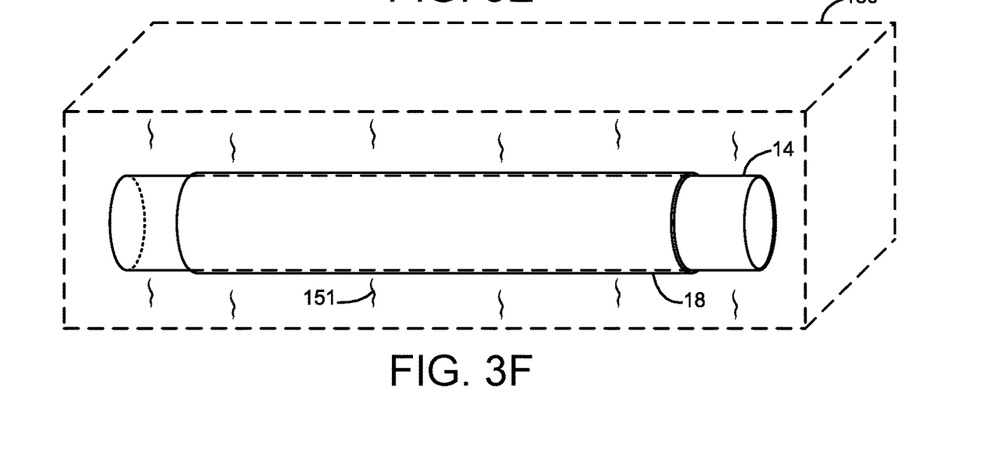

The general process steps for layering the glass, or any of the layers, includes one or more of thick- or thin-film printing and instances of settling, drying, and firing or heating the layer so printed. As shorthand from the industry, the steps are generally known as print, dry, and fire, or PDF. In more detail, FIG. 3A shows a core 14 being provided after one or more of the process of FIGS. 2A-2J. A glass paste 100 is next deposited over a mesh stencil 102. In FIG. 3B, a leveling device 104, such as a squeegee or other scraper, levels the paste on a surface of the stencil upon passing the device from position 104a to 104b. In FIG. 3C, the paste falls 120 through the mesh of the stencil in a direction of the arrows (B). In FIG. 3D, the glass paste 100 comes to contact an exterior surface 130 of the core 14. As the paste contacts the surface circumferentially, the torque from the paste allows the core 14 to rotate by gravity in the direction of the arrow (C). The core is mounted on spindles (not shown) or other such device enabling the rotation. Alternatively, FIG. 3D' shows the core 14 attached to a motor 140 that rotates the core in the direction of the arrow (C) upon the paste contacting the surface 130. In either embodiment, the rate of rotation of the core 14 matches a rate of falling of the paste from the stencil. Eventually, an entirety of the circumferences of the core is coated with the glass paste forming glass layer 18 on the core 14 as seen in FIG. 3E. The glass is then allowed to settle and dry at room temperature e.g., 20°-25° C. for about 5 to 30 minutes followed by drying at about 80° to 120° C. (100° C., typical) for about 30 to 60 minutes. In FIG. 3F, the core and glass layer 18 are provided to a curing or drying unit 150 for application of heat 151. The drying unit typifies a box oven or blast furnace and the core is provided to the unit along a conveyor, typically.

The drying unit begins drying the glass layer 18 at around room temperature followed by a curing or drying cycle of about 30 minutes reaching peak temperatures of about 800° to 830° C. for about 5 minutes around the halfway mark of the drying cycle. In one embodiment, the drying cycle includes applying infrared heat or hot air (both given generically as heat 151). Thereafter, the core and glass layer is removed from the drying unit. Both are allowed to settle at room temperature.

Figure 4A:
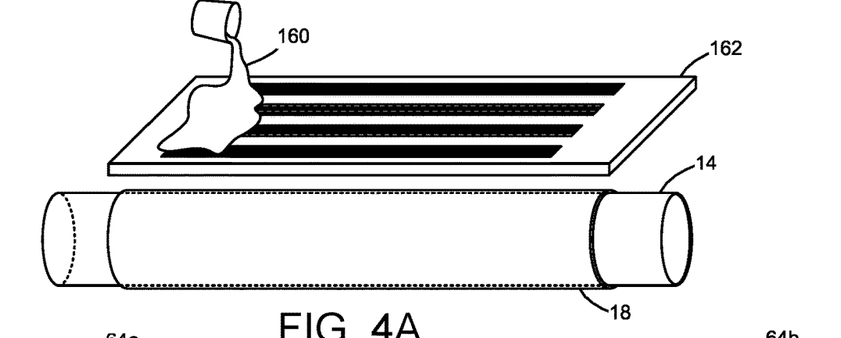
FIGS. 4A-4F are diagrammatic views of a representative sequence of patterning a resistive layer when forming a tube heater, including a conductor layer.
Figure 4B:
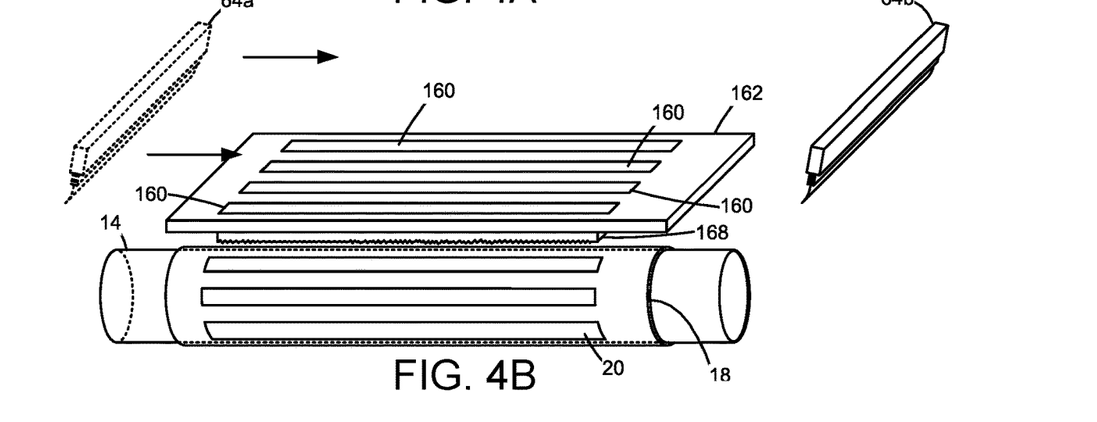
Figure 4C:
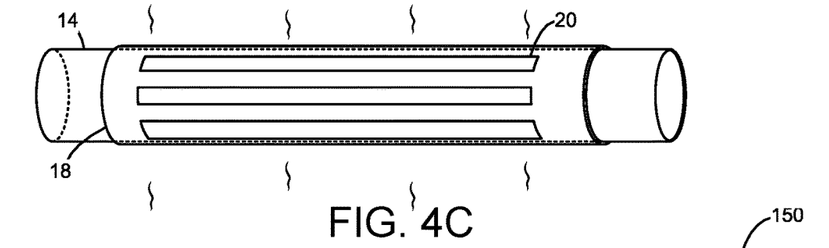
Figure 4D:
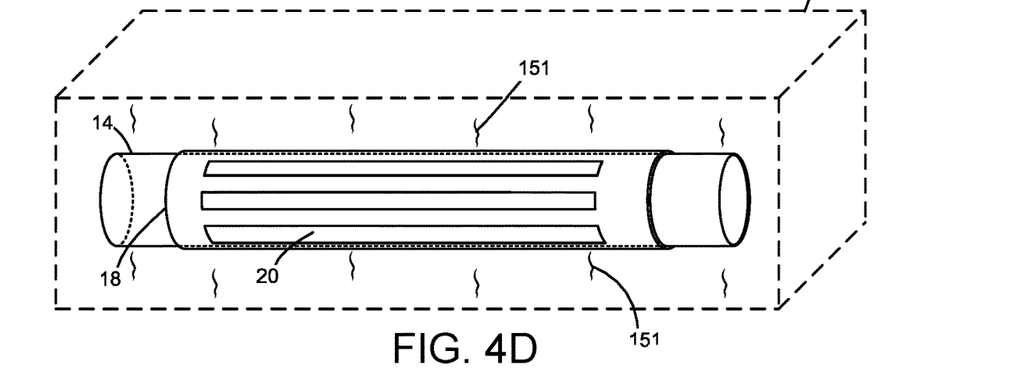

With continued reference to FIG. 1, and the processes of FIGS. 4A-4F, resistive traces are next applied to the circumferential surface of the core on top of the glass layer 18. In FIG. 4A, the resistive traces 20 result from first providing a resistive paste 160 to a mesh stencil 162. The stencil may be patterned to a width and length matching the width and length of the traces. Next, the paste 160 is leveled through the stencil with a leveling device 64 moving from positions 64a to 64b in FIG. 4B. The resistive paste is then allowed to fall through the stencil at 168. Similar to the instances of rotating the core in FIG. 3D or 3D', the core 14 rotates and the resistive traces 20 are patterned on the core 14 on top of the glass layer 18. A representative pattern of the traces is a plurality of longitudinally extending traces paralleling one another about an entire circumference of the core. Their width and length is variable depending upon the dimensions of the core. In FIG. 4C, the resistive traces 20 are dried at room temperature for a period of time from about 5 to 30 minutes and dried at about 80° to 120° C. (100° C., typical) for about 30 to 60 minutes. The traces are next fired with heat 151 in the heating unit 150. The traces are heated for about 30 minutes with a peak temperature of about 850° C. for about 5 minutes. The heating unit may also fire with a heating profile for at least 40 total minutes starting at about 25° C. and ramping up to 850° C. by 20 minutes and maintaining 850° C. for at least 10 minutes and decreasing the temperature for at least 10 minutes. In any profile, the traces settle for a period of time ranging up to one hour upon removal from the heating unit.

Figure 4E:
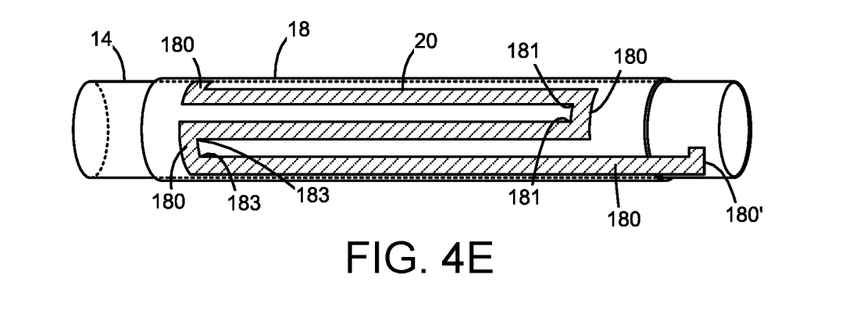

With reference to FIG. 4E, without showing the instances of printing, drying and firing, conductors 180 are applied to the core 140 and interconnect the terminal ends 181, 183 of the longitudinally-extending resistive traces 20. The result is a serpentine pattern about the circumference of the core. During use, the conductor at 180' receives power from an external voltage source to power the resistive trace 20. In turn, the resistive trace heats and provides heating to the tube heater to heat fluid in the interior of the tube. In dimensions, the thickness of the resistive trace is about 9 to 15 microns and has a length that varies according to the length of the core, but typically resides at about 50% to 90% of the length of the core. A width of each trace 20 ranges about 0.5 to 1 micron. Also, the resistive trace has a resistance of about 10-12 ohms at 195° C. The resistive trace is formed in a layer from the resistor paste comprised of silver and palladium or platinum as is the conductor formed from a conductive paste comprised of silver and palladium or platinum. In one embodiment, the resistor paste includes content of about 60% to 80% silver with the balance (other than impurities) being made up by the palladium or platinum. Also, skilled artisans will note that the process steps for layering the resistive traces followed by the conductors could be reversed.

Figure 4F:
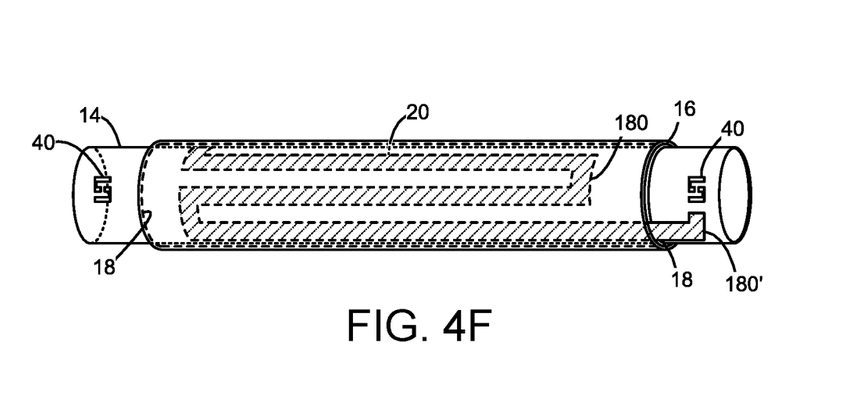

In FIG. 4F, a second glass layer 16 is applied over the resistive traces and conductors. It is applied in a thickness of about 45 to 80 microns. Unlike the glass underlying the resistive traces, however, the second glass of the second glass layer has a thermal conductivity in a much lower range of less than or equal to 0.5 W/mK. In process steps similar to layering the layer of glass 18 underlying the resistive layer, the glass overlying the resistive layer is similarly applied. One or more thermistors 40 may be also welded to the core 14 at a distal or proximate end of the tube heater. They are positioned to measure the temperature of the resistive traces and the conductor connects the thermistors to external sources (not shown) to measure, store and control the temperature of the tube heater. The thermistors are preferably resistance welded.

Figure 5:
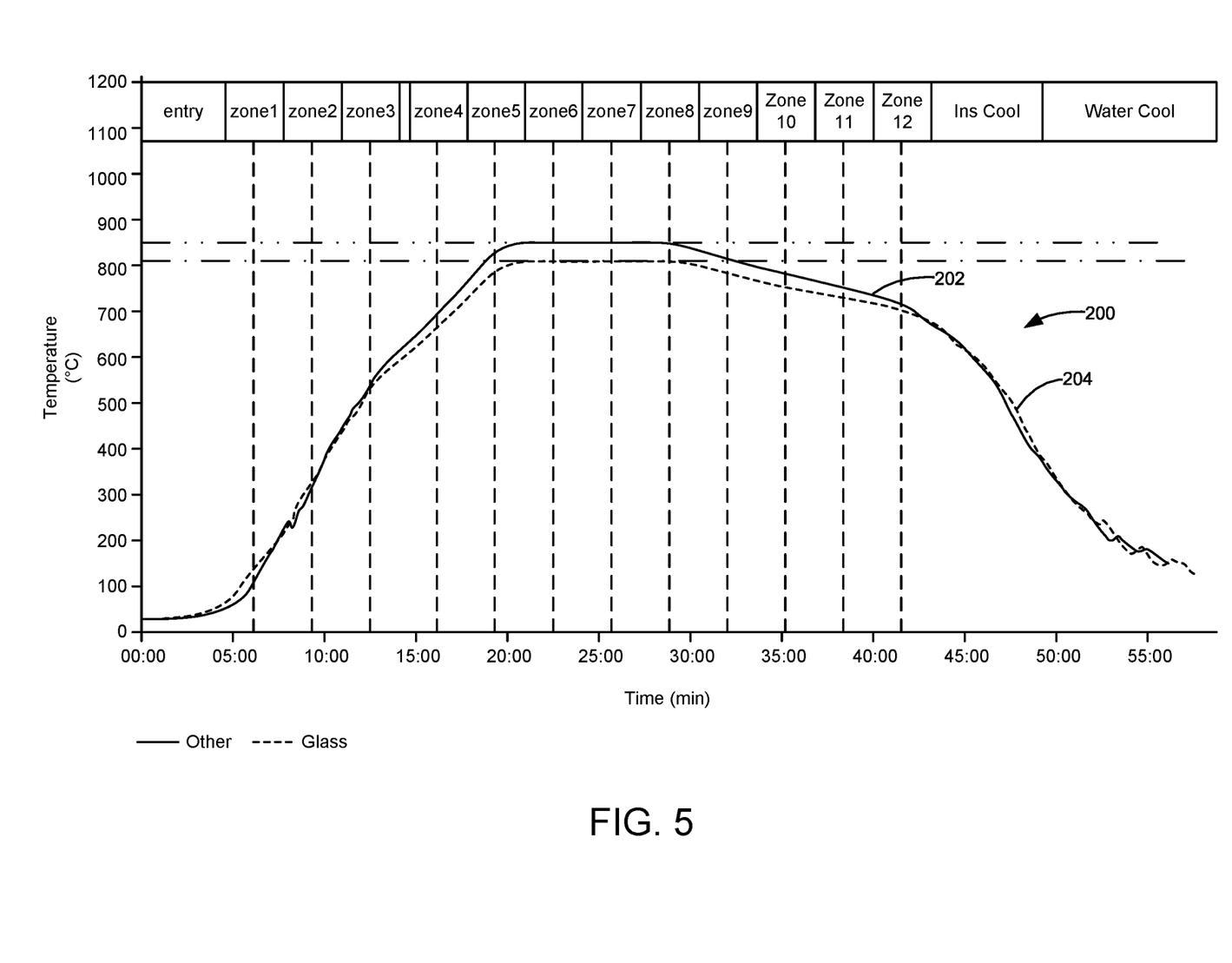
FIG. 5 is a graph of a representative heating profile of a heating unit according to embodiments of the invention.

With reference to FIG. 5, a representative firing or heating profile for any layer is shown in graph 200. Namely. the heating profile for a resistive or conductive layer is shown by the solid line 202, whereas a dashed line 204 depicts the heating profile for layering a glass. In general, the heating profile of the heating unit includes a total heating time of about 40 total minutes starting at about 25° C. and ramping up to a peak temperature (part of zones 5-8) by 20 minutes and maintaining the peak temperature for at least 10 minutes and decreasing the temperature of the heating unit (post zone 8) for at least 10 minutes thereafter. Cooling continues even further thereafter (post zone 12) until completely cooled. For the resistive or conductive layers, the peak temperature reaches about 850° C. The glass layers, on the other hand, have a peak temperature in a range from 800° to 830° C.

Without reference to any Figure, once the tube heater is formed, the resistive trace of the becomes tested under voltage conditions of 1.75 KVAC applied to the conductor layer. Resistance of the trace is tested cold at room temperature and upon heating to about 200° C. Its resistance is about 10 ohms at room temperature and about 11 ohms upon heating with a variance of about +/−2 ohms.

Advantages should be now readily apparent to those skilled in the art. Among them, a thin walled, deep drawn stainless tube serves as a core for a tube heater. Its wall thickness is multiple times thinner than anything known by the inventors. The first layer of glass on the core is a di-electric glass developed specifically for higher thermal conductivity while maintaining high di-electric strength for electrical resistivity. The second layer of glass or cover glass is developed for improved thermal insulation in order to reduce thermal losses in the tube heater. Such design improves safety over the state of the art and minimizes heat loss between the resistive trace and the fluid, thereby increasing the heating efficiency of the tube heater.

The foregoing description of several structures and methods of making the same has been presented for purposes of illustration. It is not intended to be exhaustive or to limit the claims. Modifications and variations to the description are possible in accordance with the foregoing. It is intended that the scope of the invention be defined by the claims appended hereto.

The invention claimed is:

1. A method of making a tube heater for heating a fluid in an interior of the tube heater, comprising:
   providing a stainless steel core;
   circumferentially printing a resistive layer on the stainless steel core including electrically insulating the resistive layer with first and second glass layers, one of the glass layers having a thermal conductivity of more than 2 W/mK and the other of the glass layers having a thermal conductivity of less than or equal to 0.5 W/mK;
   dimpling an inner surface of the stainless steel core; and
   providing and sealing inside pluralities of balls in an interior of the stainless steel core.

2. The method of claim 1, further including causing the pluralities of balls to impact an inner surface of the stainless steel core to cause the dimpling.

3. A method of making a tube heater for heating a fluid in an interior of the tube heater, comprising:
providing a stainless steel core;
circumferentially printing a resistive layer on the stainless steel core including electrically insulating the resistive layer with first and second glass layers, one of the glass layers having a thermal conductivity of more than 2 W/mK and the other of the glass layers having a thermal conductivity of less than or equal to 0.5 W/mK; and
arc-spraying aluminum on an inner surface of the stainless steel core.

4. A method of making a tube heater for heating a fluid in an interior of the tube heater, comprising:
providing a stainless steel core;
circumferentially printing a resistive layer on the stainless steel core including electrically insulating the resistive layer with first and second glass layers, one of the glass layers having a thermal conductivity of more than 2 W/mK and the other of the glass layers having a thermal conductivity of less than or equal to 0.5 W/mK; and
providing a mesh stencil over the stainless steel core and leveling through the mesh stencil a paste.

5. The method of claim 4, further including letting fall the paste fall through the mesh stencil.

6. A method of making a tube heater for heating a fluid in an interior of the tube heater, comprising:
providing a stainless steel core;
circumferentially printing a resistive layer on the stainless steel core including electrically insulating the resistive layer with first and second glass layers, one of the glass layers having a thermal conductivity of more than 2 W/mK and the other of the glass layers having a thermal conductivity of less than or equal to 0.5 W/mK;
letting dry the resistive layer; and
providing the resistive layer on the stainless steel core and heating the resistive layer for about 30 minutes with a peak temperature of the heating unit at about 850° C. for at least 5 minutes.

7. A method of making a tube heater for heating a fluid in an interior of the tube heater, comprising:
providing a stainless steel core; and
circumferentially printing a resistive layer on the stainless steel core including electrically insulating the resistive layer with first and second glass layers, one of the glass layers having a thermal conductivity of more than 2 W/mK and the other of the glass layers having a thermal conductivity of less than or equal to 0.5 W/mK,
wherein the providing the stainless steel core includes deep drawing a stainless steel blank through a die.

8. A method of making a tube heater for heating a fluid in an interior of the tube heater, comprising:
providing a stainless steel core;
layering a first glass on the stainless steel core, the first glass being electrically insulative and having a thermal conductivity of more than 2 W/mK;
patterning a resistive layer on the first glass; and
layering a second glass on the resistive layer, the second glass being electrically insulative and having a thermal conductivity of less than or equal to 0.5 W/mK;
dimpling an inner surface of the stainless steel core; and
arc spraying aluminum on the dimpled inner surface of the stainless steel core.

* * * * *